(12) United States Patent
Aslot et al.

(10) Patent No.: US 8,671,231 B2
(45) Date of Patent: Mar. 11, 2014

(54) FAST CANCELLATION OF INPUT-OUTPUT REQUESTS

(75) Inventors: Vishal Chittranjan Aslot, Austin, TX (US); Brian W. Hart, Austin, TX (US); Anil Kalavakolanu, Austin, TX (US); Evelyn Tingmay Yeung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/154,335

(22) Filed: Jun. 6, 2011

(65) Prior Publication Data
US 2012/0311202 A1    Dec. 6, 2012

(51) Int. Cl.
*G06F 3/00* (2006.01)
*G06F 13/00* (2006.01)
*G06F 5/00* (2006.01)

(52) U.S. Cl.
USPC .................................. 710/55; 710/32; 710/17

(58) Field of Classification Search
None
See application file for complete search history.

(56) References Cited

U.S. PATENT DOCUMENTS

| | | | |
|---|---|---|---|
| 5,255,371 A | 10/1993 | Latimer et al. | |
| 6,934,770 B1 | 8/2005 | Young | |
| 6,981,075 B2 | 12/2005 | Ayukawa et al. | |
| 2008/0313409 A1* | 12/2008 | Endo et al. | 711/141 |
| 2009/0132705 A1* | 5/2009 | Matsuzaki et al. | 709/225 |
| 2010/0030920 A1 | 2/2010 | Casper et al. | |

OTHER PUBLICATIONS

IBM, "Purge outstanding Queue Pair I/O Work Request", IP.com No. IPCOM000098030D, pp. 1-2, Mar. 2005.

* cited by examiner

*Primary Examiner* — Zachary K Huson
(74) *Attorney, Agent, or Firm* — Garg Law Firm, PLLC; Rakesh Garg; Mark C. Vallone

(57) ABSTRACT

A method, system, and computer program product for fast cancellation of an I/O request in a data processing system are provided in the illustrative embodiments. A first component in a stack comprising a plurality of components determines whether a memory buffer associated with the I/O request is valid, the memory buffer being an addressable area in a memory in the data processing system. The first component, responsive to the memory buffer being valid, creates a first request data structure corresponding to the I/O request, wherein the first request data structure includes a reference to the memory buffer. The first component passes the first request data structure to a second component in the stack.

25 Claims, 10 Drawing Sheets

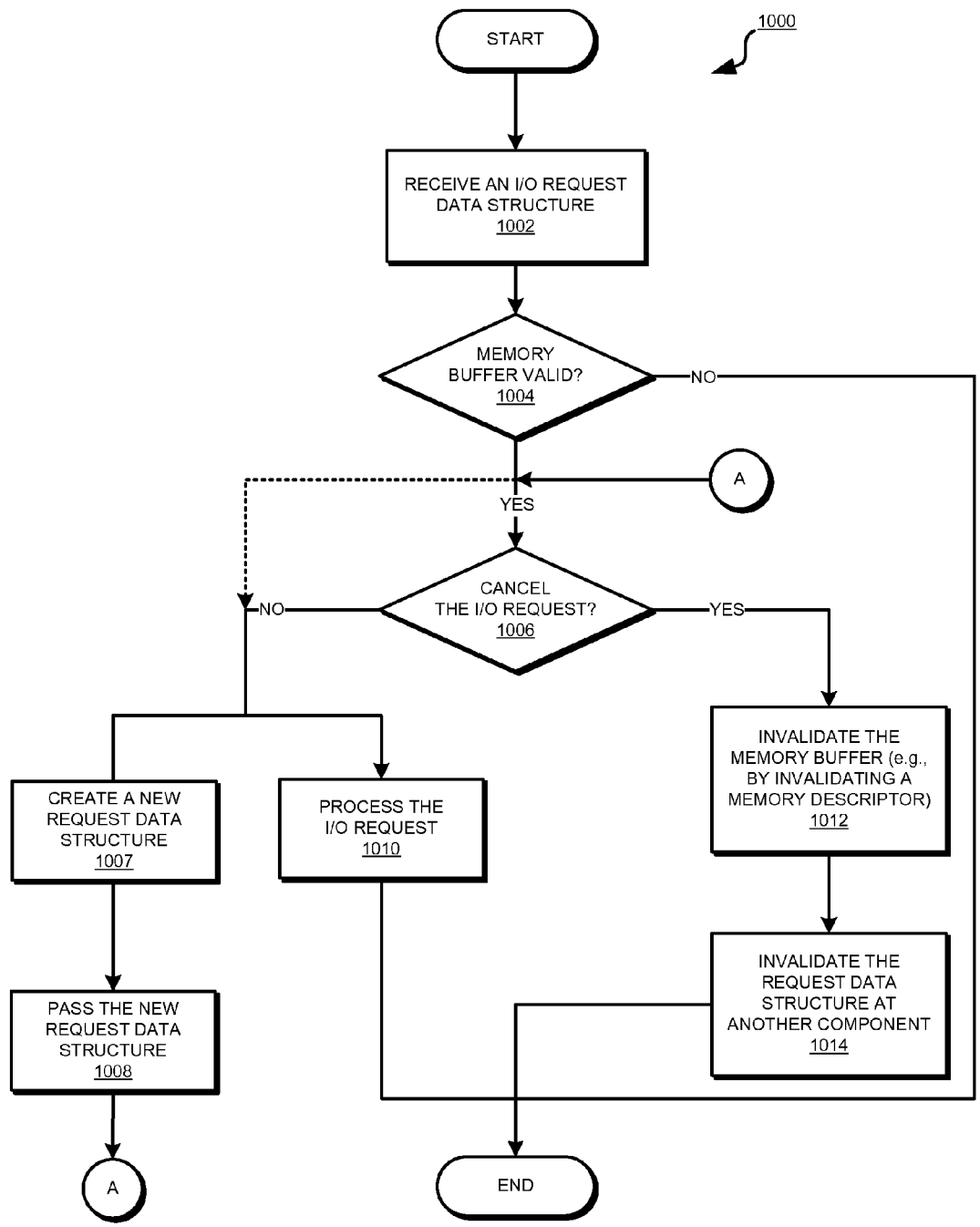

FAST CANCELLATION OF INPUT-OUTPUT REQUESTS

TECHNICAL FIELD

The present invention relates generally to a computer implemented method, system, and computer program product for processing data input-output (I/O) requests. More particularly, the present invention relates to a computer implemented method, system, and computer program product for cancelling an I/O request in an expeditious manner

BACKGROUND

Data processing systems include data storage devices for storing, processing, and moving data. A memory device, a hard disk drive, and an optical or tape drive are some examples of data storage devices. A data storage device is generally a physical component of a data processing system configured to store data.

A data storage device may also include logical or virtual components. For example, a memory may also include a space on a hard disk designated to be used as a virtual part of the memory.

In order to use data stored on a data storage device, an application has to request that data. For example, an application may read data from a hard disk using an I/O request of a certain type. The application may write that data to a memory location using a different I/O request. The application may update the data in the hard disk by writing updated data to the hard disk using another type of I/O request.

Certain components in a data processing system may also communicate with each other using I/O requests. For example one component may read or update another component's data in memory using I/O requests.

Often, in a data processing system, the component that receives an I/O request from an application does not actually perform the data input/output. A component that receives an I/O request passes the request to another component for processing. In many cases, an I/O request may pass through a series of components before reaching a component that can access the data for the operation being requested in the I/O request. Such a series of components is called a "stack." A stack is a logical hierarchical arrangement of components where a first component may be a child in a parent-child relationship with a second component, and a parent in another parent-child relationship with a third component. A parent component can have any number of children components in a stack.

An I/O request may fail to process as desired for a variety of reasons. For example, the processing of an I/O request may exceed a time threshold set for the processing, and consequently, the I/O request may fail due to a timeout. As another example, a component in a stack that may be handling the I/O request may go offline or become non-responsive, causing the I/O request to stall or hang, to wit, remain pending with the component for an indeterminate period.

As another example, a parent component in a given stack may accept the I/O request and pass the request down to a child component. The child component may recognize that the I/O request is attempting to perform an unauthorized or illegal operation, or is attempting to access prohibited data, and may stop processing the I/O request.

A component detecting a problem with an I/O request need not explicitly cancel the I/O request. Presently, an error handling mechanism in the component fails the I/O request upon detecting a problem with the I/O request. However, a process for recovering from an I/O request that has failed, or has violated a condition, may include cancelling the I/O request. For example, once a component determines that an I/O request has stalled or failed, the component may begin a cancellation process implemented for that component.

When a component cancels an I/O request, subsequent actions with respect to the I/O request, such as retrying the I/O request, or conclusively failing the I/O request and returning an error to the requesting application, are contingent upon the completion of the I/O request cancellation process. For example, an I/O request may have to wait to be retried until the information indicating a cancellation of a pending I/O request has propagated from the component that cancelled the request all the way up the stack to the root component in the stack.

SUMMARY

The illustrative embodiments provide a method, system, and computer program product for fast cancellation of I/O requests in a data processing system. According to an embodiment, a first component in a stack comprising a plurality of components determines whether a memory buffer associated with the I/O request is valid, the memory buffer being an addressable area in a memory in the data processing system. The first component, responsive to the memory buffer being valid, creates a first request data structure corresponding to the I/O request, wherein the first request data structure includes a reference to the memory buffer. The first component passes the first request data structure to a second component in the stack.

Another embodiment includes one or more computer-readable tangible storage devices, and program instructions stored on at least one of the one or more storage devices. The program instructions include first program instructions to determine, at a first component in a stack comprising a plurality of components, whether a memory buffer associated with the I/O request is valid, the memory buffer being an addressable area in a memory in the data processing system; second program instructions to, responsive to the memory buffer being valid, create a first request data structure corresponding to the I/O request, wherein the first request data structure includes a reference to the memory buffer; and third program instructions to pass the first request data structure to a second component in the stack.

Another embodiment includes one or more processors, one or more computer-readable memories, one or more computer-readable tangible storage devices, and program instructions stored on at least one of the one or more storage devices for execution by at least one of the one or more processors via at least one of the one or more memories. The program instructions include first program instructions to determine, at a first component in a stack comprising a plurality of components, whether a memory buffer associated with the I/O request is valid, the memory buffer being an addressable area in a memory in the data processing system; second program instructions to, responsive to the memory buffer being valid, create a first request data structure corresponding to the I/O request, wherein the first request data structure includes a reference to the memory buffer; and third program instructions to pass the first request data structure to a second component in the stack.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

FIG. 10 depicts a flowchart of an example process of fast cancellation of I/O requests in accordance with an illustrative embodiment;

DETAILED DESCRIPTION

Figure 1:
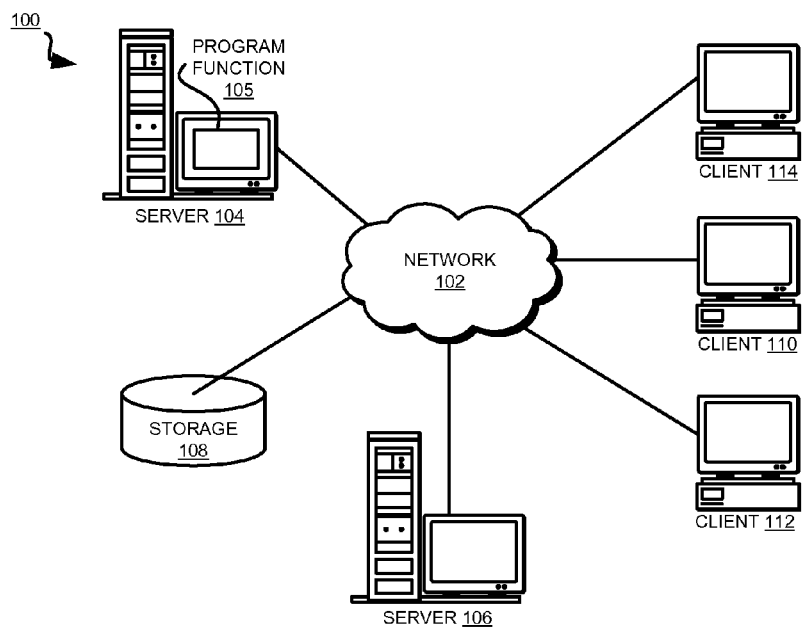
FIG. 1 depicts a pictorial representation of a network of data processing systems in which illustrative embodiments may be implemented.

When a component in a stack recognizes a problem with an I/O request, the component may initiate a recovery action. The recovery action may begin by cancelling the I/O request. The invention recognizes that a process of cancelling an I/O request can be accomplished differently in different components. In other words, presently, how the cancellation of an I/O request is handled at a particular component in a stack is dependent upon the implementation of the component in question.

The invention recognizes that an operating system may not provide, or a set of components in a stack may not use, a general cancellation mechanism for cancelling I/O requests. A general cancellation mechanism is an implementation of an I/O request cancellation operation that is useable by several components in a stack.

The invention further recognizes that even in those cases where an operating system provides a general cancellation mechanism for cancelling an I/O request, the component initiating the cancellation usually must wait for the return of the cancelled I/O request to the root of the stack before the component can retry or fail the request. Regardless of whether a general cancellation mechanism is available in a given data processing system, a component in a stack has no way of knowing whether another adjacent component in the stack is using a local cancellation mechanism or the general cancellation mechanism.

The invention recognizes that the lack of a consistent or uniform mechanism for cancelling I/O requests can result in I/O stall situations going undetected, or becoming unrecoverable when they are eventually detected. The invention also recognizes that even where a presently used operating system offers a general cancellation mechanism, the cancellation process is a slow operation. The time consumed in cancelling an I/O request using presently available I/O request cancellation methods lengthens the handling duration of an I/O request that may already have been long-delayed before the cancellation begins.

The illustrative embodiments used to describe the invention generally address and solve the above-described problems and other problems related to cancelling I/O requests in a data processing system. The illustrative embodiments provide a method, system, and computer program product for fast cancellation of I/O requests in a data processing system.

Generally, an embodiment of the invention provides a general cancellation mechanism to cancel an I/O request while the request is being processed within any component in a given stack. According to an embodiment of the invention, a component can cancel an I/O request and retry or fail the I/O request thereafter without having to wait for the cancellation information to propagate through the stack.

An embodiment further allows such a fast cancellation process to be safe from memory corruption issues, which normally are the reasons in the presently available methodologies for waiting to ensure that the cancellation has propagated through the stack. Another embodiment further provides a method for improving the performance of the fast cancellation process of an embodiment.

The cancellation of I/O requests according to an embodiment is faster as compared to the presently available methods for cancelling I/O requests. Consequently, using an embodiment, an I/O request, even if unsuccessful on one attempt, can be retried expeditiously after cancellation as compared to presently available methods of I/O request cancellation. Thus, an embodiment of the invention generally improves the responsiveness to I/O requests in a data processing system.

The illustrative embodiments are described with respect to certain data and data structures only as examples. Such descriptions are not intended to be limiting on the invention. For example, an illustrative embodiment described with respect to a data structure in memory can be implemented with a reference to the data structure in the memory within the scope of the invention. As another example, an illustrative embodiment described with respect to a reference to a data structure in memory can be implemented using a reference to an intermediate data structure, which includes the reference to the data structure in the memory within the scope of the invention.

Furthermore, the illustrative embodiments may be implemented with respect to any type of data, data source, or access to a data source over a data network. Any type of data storage device may provide the data, such as a boot image, to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
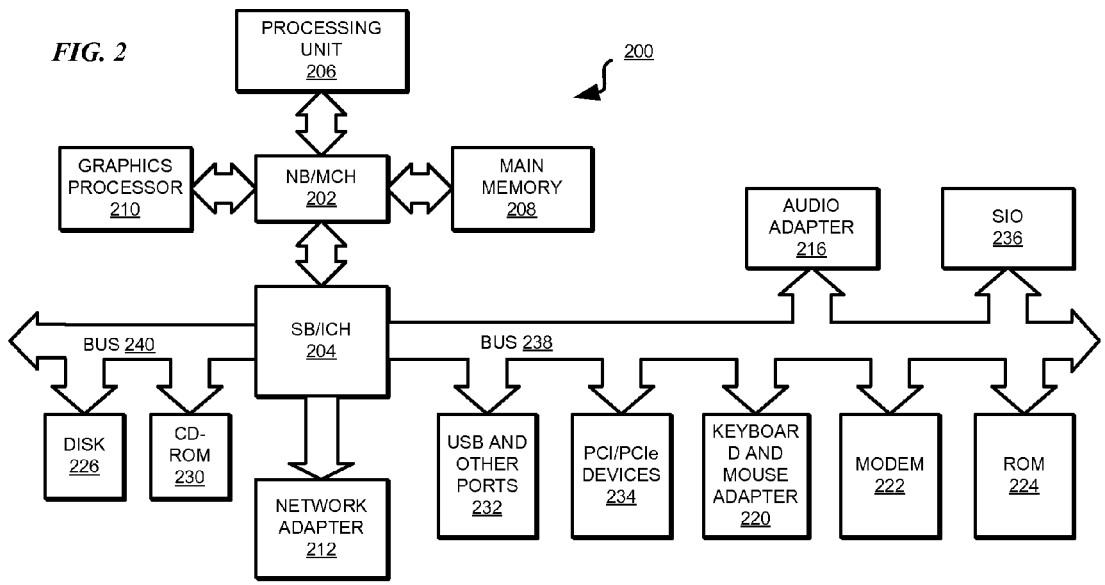
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include program function 105 that may implement all or part of an embodiment. For example, a component in a stack may invoke program function 105 for accomplishing fast cancellation of an I/O request in accordance with an illustrative embodiment. As an example, program function 105 may be implemented in a memory management program, such as in a kernel module of an operating system executing in server 104. Program function 105 may be implemented as program instructions that can be stored using a data storage device and executed using a processor.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on one or more storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
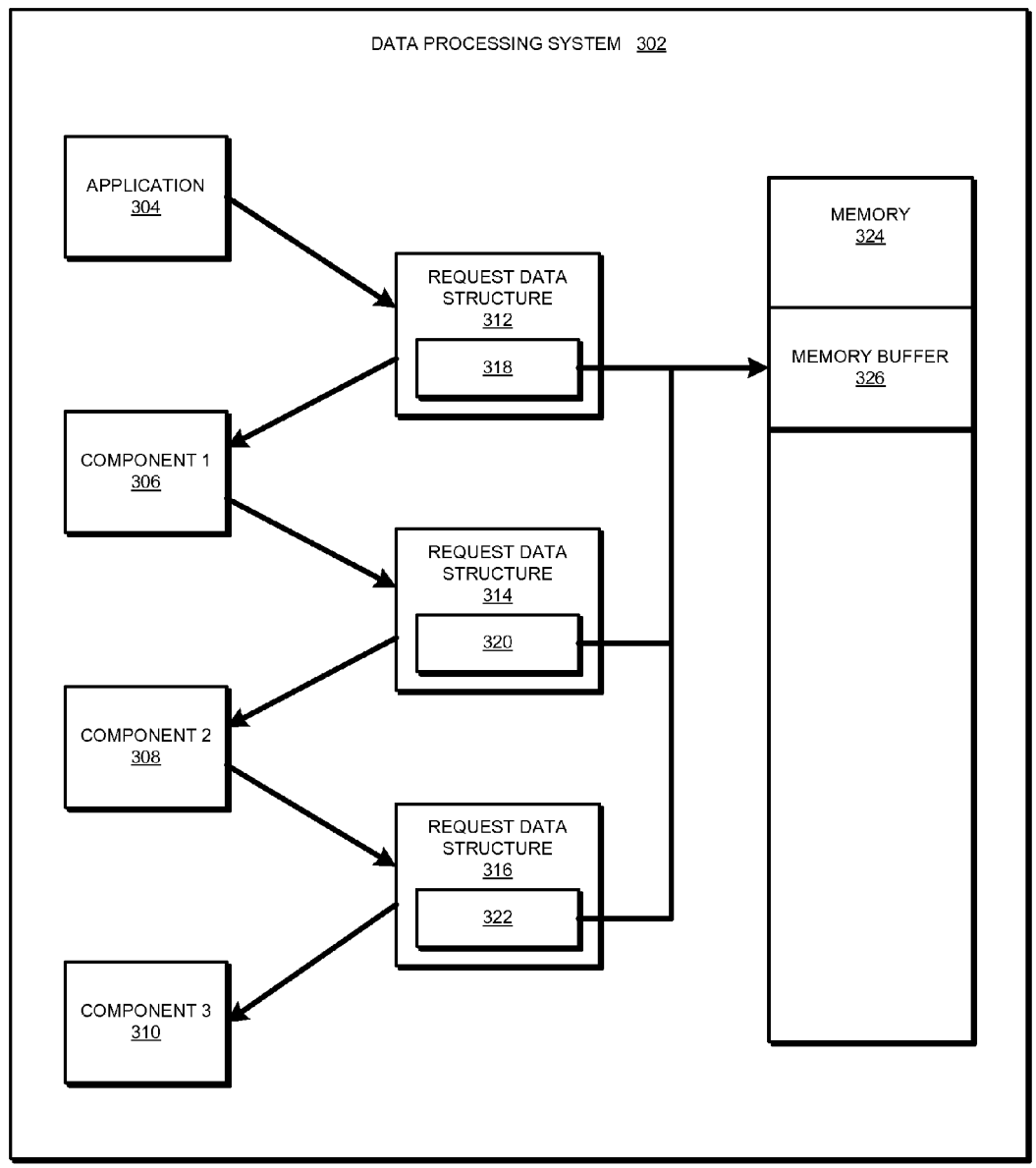
FIG. 3 depicts a block diagram of a modified process of passing an I/O request in a stack for accomplishing a fast cancellation of the I/O request in accordance with an illustrative embodiment.

With reference to FIG. 3, this figure depicts a block diagram of a modified process of passing an I/O request in a stack for accomplishing a fast cancellation of the I/O request in accordance with an illustrative embodiment. Data processing system 302 may be a physical data processing system, such as server 104 or another stand-alone data processing system, or a logical data processing system, such as a logical partition in a host data processing system.

Application 304 may be executing in data processing system 302. Application 304 may send an I/O request. A stack in data processing system 302 may include components 306, 308, and 310, such that component 306 receives the request, component 306 passes the request to component 308, component 308 passes the request to component 310, and component 310 processes the I/O request by performing the operation requested in the I/O request. The I/O request may be described in request data structure 312. A component, such as any of components 306, 308, or 310 may be implemented in software as program code, in hardware as a circuit, or a combination as a firmware.

Component 306 receives request data structure 312. Component 306 determines that the I/O request in request data structure 312 should be passed to component 308. Accordingly, component 306 causes request data structure 314 to be constructed to include the data of the I/O request, such data being copied or transformed from analogous data in request data structure 312.

Component 308 receives request data structure 314. Component 308 determines that the I/O request in request data structure 314 should be passed to component 310. Accordingly, component 308 causes request data structure 316 to be constructed to include the data of the I/O request, such data being copied or transformed from analogous data in request data structure 314. Component 310's processing of the I/O request based on the data in request data structure 316 is not shown.

Request data structures 312, 314, and 316 may be constructed in any form suitable for components 306, 308, and 310 respectively. Furthermore, request data structures 312, 314, and 316 may be constructed using any known I/O request handling mechanisms.

An illustrative embodiment modifies request data structure 312 that is constructed in this manner to include reference 318. Request data structures 314 and 316 are also modified to include references 320 and 322 respectively. Each of references 318, 320, and 322 are references, such as an address or a pointer, to an area of memory 324. Memory 324 is accessible to components 306, 308 and 310, as well as to application 304. As an example, global memory in a given data processing system may be used as memory 324.

Particularly, references 318, 320, and 322 are references to memory buffer 326 in memory 324. Memory buffer 326 may be an area in memory 324 designated for processing the I/O request described in any of request data structures 312, 314, and 316. For example, in one embodiment, memory buffer 326 may be used for passing the results of the I/O request back to application 304. In another embodiment, memory buffer 326 may just be an area of an arbitrary size in memory 324 and may not be used for any particular purpose other than as described in relation to an embodiment. For example, in such an embodiment, memory buffer 326 may be just one byte long.

Note that while each of request data structures 312, 314, and 316 may be created distinctly from each other in different parts of memory 324 or another memory, references 318, 320, and 322 refer to the same memory buffer, memory buffer 326 in memory 324. For example, when component 306 creates request data structure 314 from request data structure 312, component 312 can copy reference 318 into request data structure 314 to form reference 320. Other components in a given stack may copy the reference to memory buffer 326 from an incoming request data structure to an outgoing request data structure in a similar manner.

Figure 4:
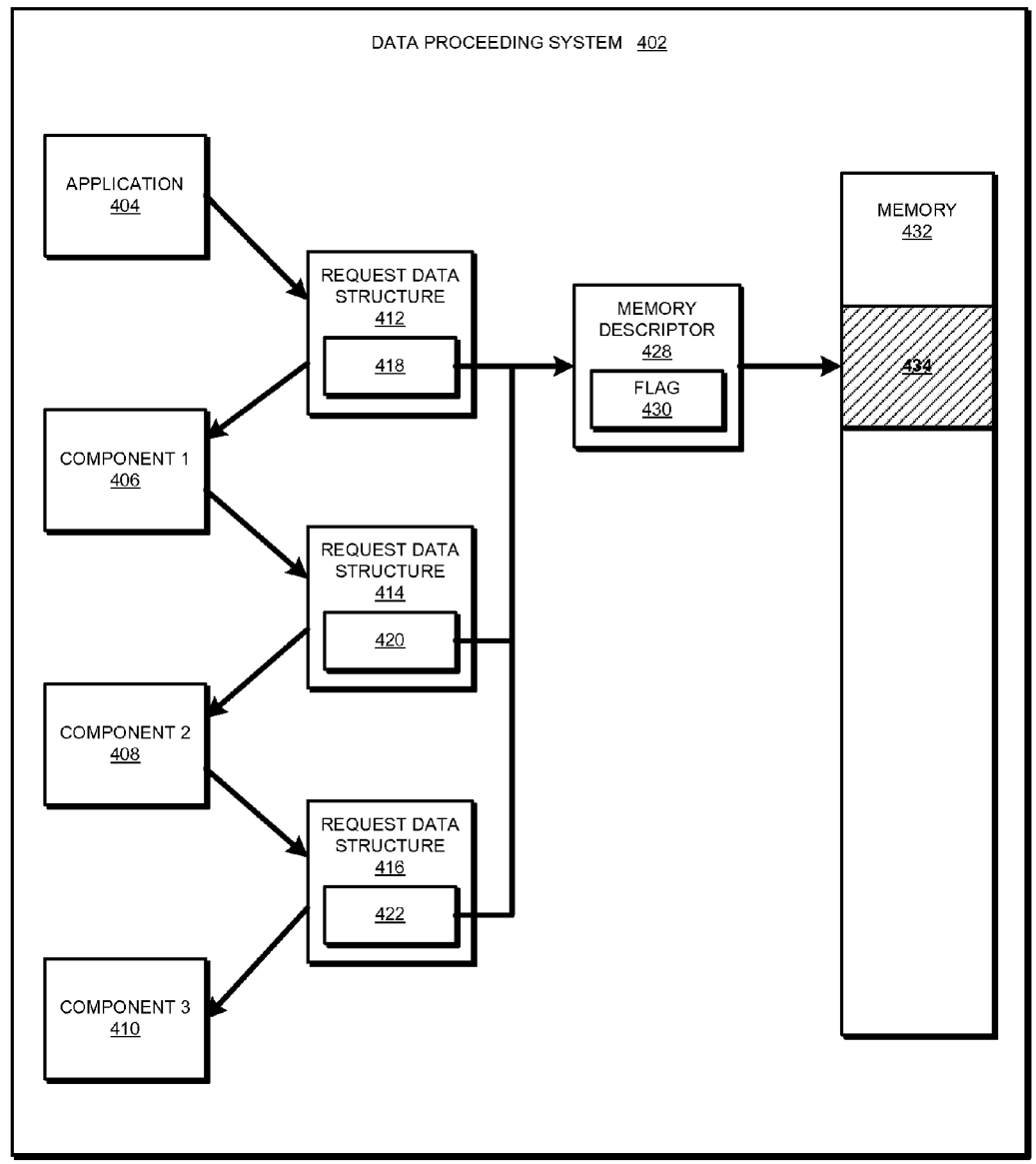
FIG. 4 depicts a block diagram of another modified process of passing an I/O request in a stack for accomplishing a fast cancellation of the I/O request in accordance with an illustrative embodiment.

While this figure depicts memory buffer 326 as an area in memory 324, such depiction does not imply a limitation on the invention. As shown in FIG. 4, a memory descriptor describing a memory buffer may be an intermediate data structure, perhaps in a memory different from memory 324, which may reference or describe an area in memory 324, for example, memory buffer 326. As will be apparent from this disclosure to a person of ordinary skill in the art, any number of references, intermediate data structures, and similar redirections may be used in conjunction with an illustrative embodiment, and the same are contemplated within the scope of the invention.

In operation, an illustrative embodiment of FIG. 3 facilitates fast cancellation of the I/O request as follows. Suppose that component 310 determines that the I/O request in request data structure 316 should be cancelled. In accordance with this illustrative embodiment, component 310 invalidates memory buffer 326. For example, component 310 may call program function 105 in FIG. 1 to cause memory buffer 326 to become invalid. Consequently, reference 322 in request data structure 316 refers to an invalid buffer. For example, by invaliding memory buffer 326, reference 322 may point to an unusable part of memory 324, such as an invalid address in memory 324, a non-accessible area of memory 324, or even to memory buffer 326 but memory buffer 326 may no longer be accessible in memory 324.

Operating in accordance with an illustrative embodiment, each component in the stack verifies that the reference in the request data structure which the component is processing points to a valid memory buffer before processing or passing the I/O request in the request data structure. For example, component 306 verifies that memory buffer 326 referenced by reference 318 in request data structure 312 is valid (or is not invalid), to wit, reference 318 is pointing to a valid area occupied by memory buffer 326, before creating request data structure 314. Component 308 similarly verifies that reference 320 in request data structure 314 is referencing valid memory buffer 326 before creating request data structure 316; and component 310 similarly verifies that reference 322 in request data structure 316 is referencing valid memory buffer 326 before performing an operation requested in the I/O request of request data structure 316. Should any component in the stack find that the reference to memory buffer 326 in the corresponding request data structure is referencing invalid memory buffer 326, the component does not process the I/O request in the corresponding request data structure and considers the I/O request cancelled.

Continuing with the example where component 310 invalidates memory buffer 326 and cancels the I/O request of request data structure 316, component 310 can retry or fail the I/O request anytime after invalidating memory 326. Unlike the I/O request cancellation mechanisms in the prior art, no risk of memory corruption exists even if component 310 retries the I/O request immediately. The memory corruption problem is avoided in an embodiment because no other component in the stack, whether a parent or a child of component 310, will be able to process the cancelled I/O request, as a valid memory buffer 326 is a precondition to such processing, and that precondition is no longer satisfied once component 310 invalidated memory buffer 326.

With reference to FIG. 4, this figure depicts a block diagram of another modified process of passing an I/O request in a stack for accomplishing a fast cancellation of the I/O request in accordance with an illustrative embodiment. Data processing system 402, application 404, components 406, 408, and 410, request data structures 412, 414, and 416, and memory 432 correspond to data processing system 302, application 304, components 306, 308, and 310, request data structures 312, 314, and 316, and memory 324 respectively in FIG. 3.

In accordance with another embodiment, request data structures 412, 414, and 416 are modified to include references 418, 420, and 422 in a manner analogous to references 318, 320, and 322 respectively in FIG. 3. References 418, 420, and 422 included in request data structures 412, 414, and 416 respectively reference memory descriptor 428. Memory descriptor 428 may be a reference or description of a memory buffer that is usable in a manner analogous to memory buffer 326 in FIG. 3. However, as different from memory buffer 326 in FIG. 3, memory descriptor 428 is an intermediate data structure not limited to memory 432, and maps to area 434 in memory 432. For example, memory descriptor 428 may be an area in a virtual address space corresponding to memory 432.

Memory descriptor 428 further includes flag 430. Hag 430 may be any data structure suitable for storing (or referencing) information that can indicate at least whether memory descriptor 428 is valid or invalid. For example, flag 430 may be space sufficient for storing bit flags, integers, Boolean data, another type of data or a pointer thereto. In another example, flag 430 may hold more than just valid/invalid status information about memory descriptor 428. For example, as described later with respect to FIGS. 9 and 11, flag 430 may also be usable to indicate whether a memory buffer referenced by memory descriptor 428 is free for reusing with another I/O request.

In operation, an illustrative embodiment of FIG. 4 facilitates fast cancellation of the I/O request in a manner similar to the operation of FIG. 3. For example, component 410 may determine that the I/O request in request data structure 416 should be cancelled. In accordance with this illustrative embodiment, component 410 invalidates memory descriptor 428. For example, component 410 may call program function 105 in FIG. 1 to set flag 430 to an "invalid" status, e.g., "0," thereby causing memory descriptor 428 to become invalid. Invalidating memory descriptor 428 is a way of invalidating the corresponding memory buffer. Thus, flag 430 is another example way of invalidating a memory buffer referenced by memory descriptor 428 in addition to the other example ways of invalidating a memory buffer, as described with respect to memory buffer 326 in FIG. 3.

Similar to the manner of operation described with respect to FIG. 3, before passing or processing the I/O request, a component in the stack determines whether memory descriptor 428 is still valid. According to an embodiment using the process of FIG. 4, a component can make such a determination by checking the value of flag 430. If flag 430 indicates a "valid" status, memory descriptor 428 is valid and available for use with the I/O request and a component can proceed with processing the corresponding request data structure.

Component 410 can retry or fail the I/O request anytime after invalidating memory 428. The memory corruption problem is avoided in an embodiment using the process of FIG. 4 as well because no other component in the stack, whether a parent or a child of component 410, will be able to process the cancelled I/O request, valid memory descriptor 428 being a precondition to such processing, and that precondition no longer being satisfied once component 410 invalidated memory descriptor 428.

Figure 5:
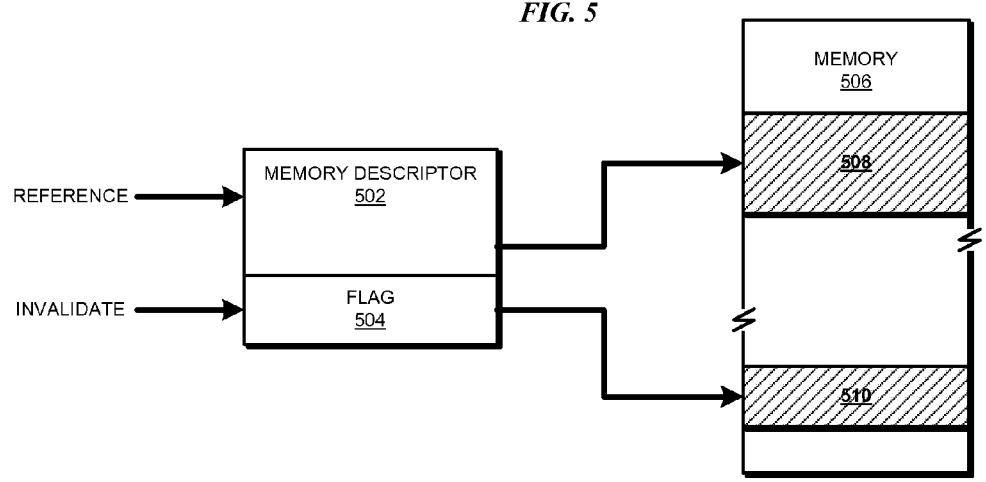
FIG. 5 depicts a block diagram of an example configuration of a memory descriptor and a corresponding flag in accordance with an illustrative embodiment.

With reference to FIG. 5, this figure depicts a block diagram of an example configuration of a memory descriptor and a corresponding flag in accordance with an illustrative embodiment. Memory descriptor 502 may be analogous to memory descriptor 428 in FIG. 4, and may be used in a similar manner.

Flag 504 is analogous in purpose and use as flag 430 in FIG. 4. However, instead of being included in memory descriptor 502, flag 504 is a data structure only related to memory descriptor 502. For example, memory descriptor 502 maps to area 508 in memory 506 as depicted, and flag 504 may be a separate data structure mapping to another area 510 in memory 506. Generally, flag 504 and memory descriptor 502 may be related to one another only in the fact that flag 504 holds the validity status of memory descriptor 502. Flag 504 and memory descriptor 502 may be distinct data structures, in distinct memory locations, referencing distinct memory spaces, or a combination thereof, without limitation on the invention.

Manipulations of flag 504 are similar to the manipulations of flag 430 described with respect to FIG. 4. As a precondition to processing or passing an I/O request, a component in a stack checks flag 504 to determine whether memory descriptor 502 is valid. When a component in the stack decides to cancel an I/O request, the component sets flag 504 to indicate an "invalid" status in a similar manner as flag 430 in FIG. 4.

Figure 6:
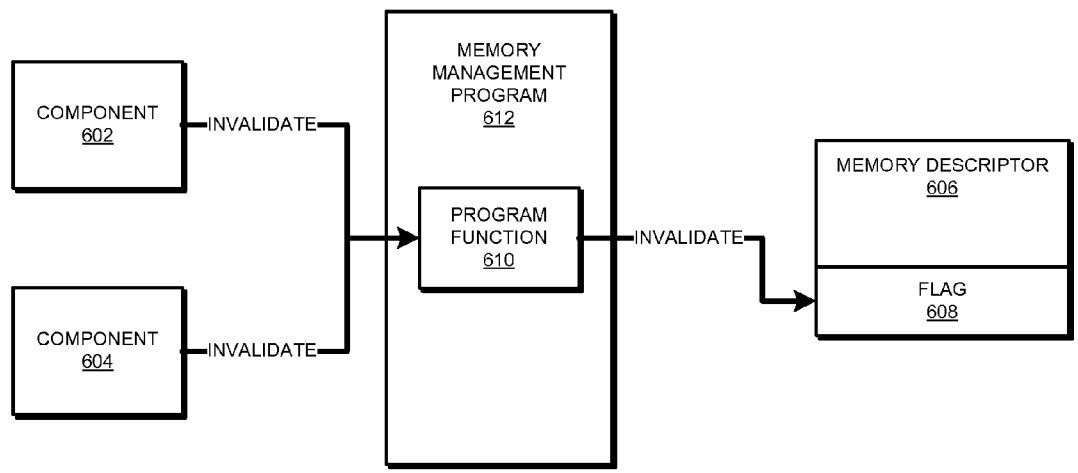
FIG. 6 depicts a block diagram of an improved memory management program for fast cancellation of I/O requests in accordance with an illustrative embodiment.

With reference to FIG. 6, this figure depicts a block diagram of an improved memory management program for fast cancellation of I/O requests in accordance with an illustrative embodiment. Each of components 602 and 604 may be analogous to any of components 406, 408, or 410 in FIG. 4. Memory descriptor 606 and flag 608 may be analogous to memory descriptor 502 and flag 504 respectively in FIG. 5, or memory descriptor 428 and flag 430 respectively in FIG. 4.

Multiple components and applications may access memory descriptor 606 and flag 608, as described with respect to FIGS. 3 and 4. Because of this global nature of memory descriptor 606 and flag 608, access to flag 608 should be controlled through a gate keeping process.

As an example, program function 610 may be similar to program function 105 in FIG. 1, and may be implemented in memory management program 612. Memory management program 612 may be any application or firmware capable of managing access to a shared area of a given memory. Program function 610 may be implemented as a function, routine, application program interface (API), method, service, or any other type of interface that may be accessible to components in a stack which handles I/O requests.

Component 602 calls program function 610 to invalidate memory descriptor 606, and in response, program function 610 sets flag 608 to an "invalid" status. Component 604 may similarly call program function 610, and the calls from component 604 need not be synchronous to or dependent upon the call from component 602. Program function 610 implemented in memory management program 612 performs the gate keeping operation to manage updates to flag 608 and to ensure a consistent state of data in flag 608.

Generally, a flag, such as flag 430 in FIG. 4, flag 504 in FIG. 5, or flag 608 in FIG. 6, indicates that the associated memory descriptor (and consequently the corresponding memory buffer) has been invalidated. By implication therefore, the flag indicates that the I/O request has been cancelled through a process of invalidating a memory buffer according to an illustrative embodiment.

In one example implementation, a reference to a memory buffer, such as a reference to any of memory descriptors 428 in FIG. 4, 502 in FIG. 5, or 606 in FIG. 6, is a "cross memory descriptor" (xmemd), which references a buffer that will be used for satisfying an I/O request. The memory buffer referenced by xmemd can be created in a global memory or may be an intermediate data structure.

In such an example implementation, as an I/O request traverses the stack of participating components, a series of request data structures (struct bufs) are created to represent the I/O request. The xmemd is copied from one request data structure to the next as each component handles the request. A component in the stack invalidates the xmemd so that further attempts to use the memory descriptor to satisfy the I/O request by any component in the stack will fail. The implementation allows a component to cancel an I/O request and then immediately retry or fail the request without having to wait for confirmation of the cancellation from the other layers in the stack.

This fast cancellation implementation is safe even if a component lower in the stack is not aware of the cancellation by another component. If the lower component takes an action towards satisfying the I/O request, the action fails without allowing alteration of the memory descriptor referenced by the invalidated xmemd. The failure of the action to satisfy the I/O request then causes the cancelled I/O request to fail naturally via the lower component's existing error recovery mechanism.

Figure 7:
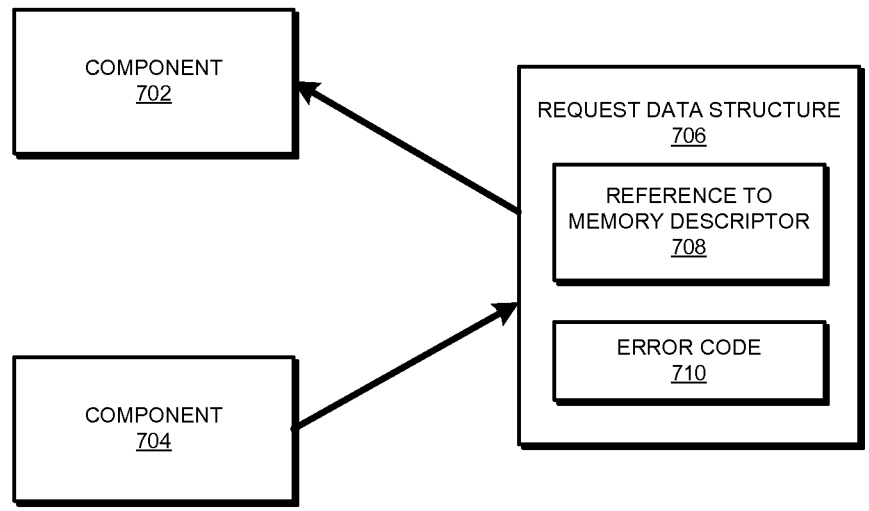
FIG. 7 depicts a block diagram of a modified request data structure for improving the fast cancellation process in accordance with an illustrative embodiment.

With reference to FIG. 7, this figure depicts a block diagram of a modified request data structure for improving the fast cancellation process in accordance with an illustrative embodiment. Each of components 702 and 704 may be analogous to any of components 602 and 604 in FIG. 6.

Request data structure 706 includes data of an I/O request as described earlier. Reference 708 may be similar to any of references 418, 420, or 422 in FIG. 4. Error code 710 may be a data structure associated with request data structure 706 to hold an indication of an error that occurs in the processing of the I/O request. Error code 710 may hold any type or structure of the indication, including but not limited to alphanumeric values.

As an example, assume that component 704 cancels the I/O request of request data structure 706. Component 704 sets error code 710 to a pre-determined value to indicate that the I/O request has been cancelled. Request data structure 706 is then passed back up the stack to the parent of component 704, component 702 as depicted. Contents of error code 710 indicate to component 702 that the I/O request has been cancelled.

In one embodiment, error code 710 may further indicate that the I/O request was cancelled by invalidating the associated memory descriptor. In another embodiment, error code 710 may further include information about the reason for the cancellation. An implementation may modify error code 710 to include these or different pieces of information for a similar purpose without limitation on the invention.

Figure 8:
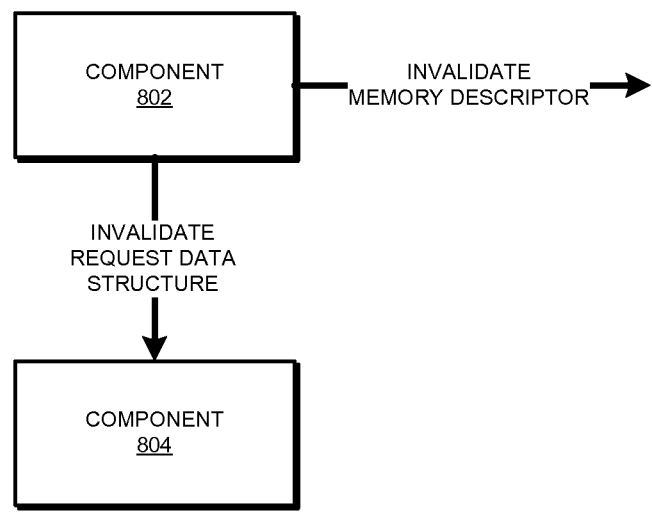
FIG. 8 depicts a block diagram of a modified interaction between components in a stack for improving the fast cancellation process in accordance with an illustrative embodiment.

With reference to FIG. 8, this figure depicts a block diagram of a modified interaction between components in a stack for improving the fast cancellation process in accordance with an illustrative embodiment. Each of components 802 and 804 may be analogous to any of components 702 and 704 in FIG. 7.

As an example, assume that component 802 passes an I/O request to component 804 via a request data structure. Before component 804 returns the request data structure to component 802, such as in FIG. 7, component 802 decides to cancel the I/O request for some reason. According to an embodiment, component 802 calls a program function in a memory management program, such as program function 610 in memory management program 612 in FIG. 6, to invalidate the memory descriptor associated with the I/O request.

As a way of improving the performance of the above described fast cancellation of the I/O request, components 802 and 804 may further implement interfaces that allow them to communicate to each other regarding the fast cancellation. For example, component 802 may invoke an API in component 804 to inform or instruct component 804 to regard the request data structure of the I/O request as invalid due to the cancellation of the request at component 802. Component 804, in response, may invalidate the request data structure in any suitable manner For example, in one embodiment, component 804 may set the error code in the request data structure, such as error code 710 in FIG. 7, to a value indicating that the I/O request was being cancelled. In another embodiment, component 804 may set the error code to indicate that the cancellation was in response to an instruction from component 802. In another embodiment, component 804 may cancel the I/O request and set the error code in the request data structure without invoking the program function in the memory management program to invalidate the memory descriptor.

Figure 9:
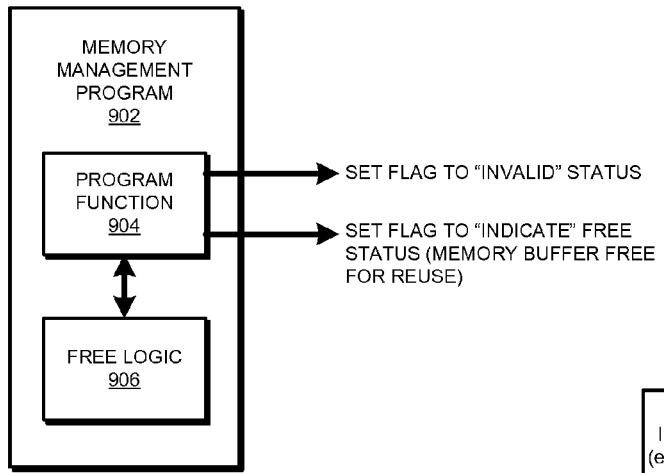
FIG. 9 depicts a block diagram of a memory management program modified for fast cancellation of I/O requests in accordance with an illustrative embodiment.

With reference to FIG. 9, this figure depicts a block diagram of a memory management program modified for fast cancellation of I/O requests in accordance with an illustrative embodiment. Memory management program 902 may be analogous to memory management program 612 in FIG. 6, with further modifications as described herein.

Program function 904 may be analogous to program function 610 in FIG. 6. As described with respect to FIG. 6, a component in a stack may call program function 904 to set a flag associated with a memory descriptor to indicate an "invalid" status of the memory descriptor.

Memory management program 902 further includes free logic 906. Free logic 906 may be computer program code implementing logic to determine when an invalid memory buffer is safe to reuse for another I/O request.

For example, during the processing of one I/O request, a memory descriptor of a memory buffer may be set as "invalid." According to an embodiment, an invalid memory buffer cannot be used for any further processing, retry, or failing of that I/O request. However, if several memory buffers become invalid in this manner, and cannot be reused for other I/O requests, by the same or different processors, the global memory in the data processing system may eventually become depleted. To avoid global memory depletion, an invalid buffer should eventually become reusable or "free" for another I/O request upon meeting some conditions. Program function 904 may be enhanced to modify the flag associated with a memory descriptor to not only an "invalid" status, but also a "free" status to allow such reuse.

As an example, one embodiment of free logic 906 may set a time threshold, which may be significantly longer than the longest I/O request processing time recorded in the data processing system. Such an embodiment may not guarantee a memory corruption free operation. For example, a possibility exists that even after the passage of the time threshold, a component in a stack may not have completely processed a cancelled I/O request, the memory descriptor may be marked as "free," another I/O request's data may be stored in the memory buffer, and the component still processing the previous cancellation may use that data and cause a memory corruption. Still, such an embodiment can be inexpensively implemented and offers reasonable assurance of avoiding memory corruption under most operating conditions.

As another example, another embodiment of free logic 906 may maintain a counter of the number of references made to the memory descriptor. For example, free logic 906 may increment a count when a new request data structure is created for an I/O request and may decrement the count when a request data structure is returned or destroyed. Such an embodiment may accurately free the memory descriptor for reuse when the count reaches a zero value indicating that no references to the memory descriptor remain in connection with the processing of one I/O request. Thereafter, program function 904 may set the flag of the memory descriptor to "free," allowing the reuse of the memory buffer.

These example embodiments of the free logic are not intended to be limiting on the invention. Those of ordinary skill in the art will be able to conceive from the disclosure many other ways of implementing free logic 906, and the same are contemplated within the scope of the invention.

With reference to FIG. 10, this figure depicts a flowchart of an example process of fast cancellation of I/O requests in accordance with an illustrative embodiment. Process 1000 may be implemented in a component, such as in any of components 802 or 804 in FIG. 8.

According to process 1000, the component receives an I/O request (block 1002). The component determines whether a memory buffer associated with the I/O request is valid, such as when a corresponding memory descriptor is valid (block 1004). If the memory buffer is not valid ("No" path of block 1004), process 1000 ends thereafter. In one embodiment (not shown), the component may utilize an error handling operation implemented therein to handle the I/O request that cannot be processed because of the invalid memory buffer.

If the memory buffer is valid ("Yes" path of block 1004), the component determines whether the I/O request has to be cancelled (block 1006). Process 1000 may not always follow the "Yes" path of block 1004 to block 1006. For example, in some cases, the "Yes" path of block 1004 may omit block 1006 at one point in the processing of an I/O request, and may return to block 1006 at another point in the processing.

For example, following the "Yes" path of block 1004 (depicted as a dotted line), the component may create a new request data structure corresponding to the I/O request of the request data structure received at the component (block 1007). The component may then pass the newly created request data structure associated with the I/O request to another component in the stack (block 1008). Following the passing step in block 1008, the component may exit at exit point marked "A" and reenter at entry point marked "A" to proceed to block 1006 and determine whether the I/O request should be cancelled.

Following the "Yes" path of block 1004 (depicted as a dotted line), the component may alternatively process the I/O request, such as when the component can actually perform the operation being requested in the I/O request (block 1010). Process 1000 may end thereafter.

The component may perform block 1008 or 1010 if the I/O request should not be cancelled according to the determination in block 1006 ("No" path of block 1006). If, however, the I/O request should be cancelled ("Yes" path of block 1006), the component sends a request to invalidate the memory buffer associated with the I/O request, such as by calling a program function, such as program function 904 in FIG. 9, which sets a flag in a corresponding memory descriptor to "invalid", (block 1012). Process 1000 may end thereafter (not shown), or optionally send a request to invalidate the request data structure to another component (block 1014). Process 1000 may end thereafter or perform additional operations following the cancellation of an I/O request as described earlier (not shown).

Figure 11:
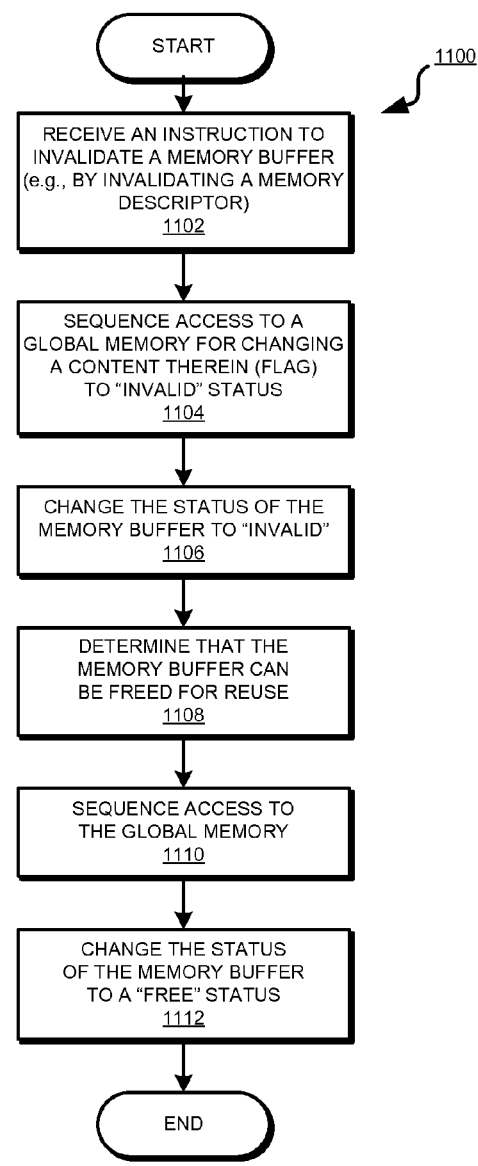
FIG. 11 depicts a flowchart of a further improved process of fast cancellation of I/O requests in accordance with an illustrative embodiment.

With reference to FIG. 11, this figure depicts a flowchart of a further improved process of fast cancellation of I/O requests in accordance with an illustrative embodiment. Process 1100 may be implemented using memory management program 902 in FIG. 9.

Using a memory management program of an illustrative embodiment as an example implementation of process 1100, the memory management program receives from a component in a stack an instruction to invalidate a memory buffer, such as by setting a flag in a corresponding memory descriptor to "invalid", (block 1102). The memory management program sequences access to a global memory for changing content therein, to wit, the flag associated with a memory descriptor, to an "invalid" status (block 1104). The memory management program changes the status of the memory buffer to "invalid" by appropriately modifying the contents of the flag in the associated memory descriptor (block 1106).

At some point in time, such as after a predetermined period, or upon an event in the data processing system, or by execution of code corresponding to a logic or rule, the memory management program, using the free logic, determines that the memory buffer that was invalidated in block 1006 can be freed for reuse (block 1108). If required, the memory management program may again sequence access to the global memory occupied by the memory buffer's memory descriptor flag (block 1110). The memory management program changes the status of the memory buffer to a "free" status by manipulating the contents of the flag (block 1112). Process 1100 ends thereafter.

Figure 12:
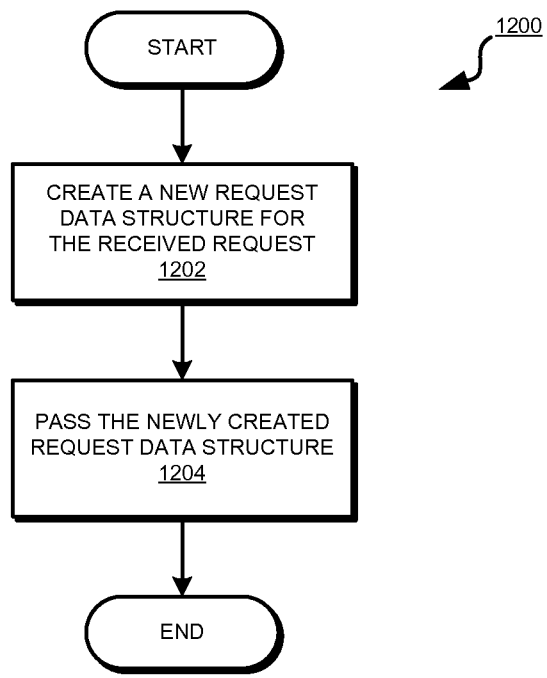
FIG. 12 depicts a flowchart of a process of passing an I/O request from one component to another in accordance with an illustrative embodiment.

With reference to FIG. 12, this figure depicts a flowchart of a process of passing an I/O request from one component to another in accordance with an illustrative embodiment. Process 1200 may be implemented in a component, such as in component 802 in FIG. 8.

A component creates a new request data structure for an I/O request that the component receives (block 1202). The component may receive the I/O request from an application executing in a data processing system, or in a request data structure from another component.

The component may pass the newly created request data structure to another component for processing the I/O request (block 1204). Process 1200 ends thereafter.

Figure 13:
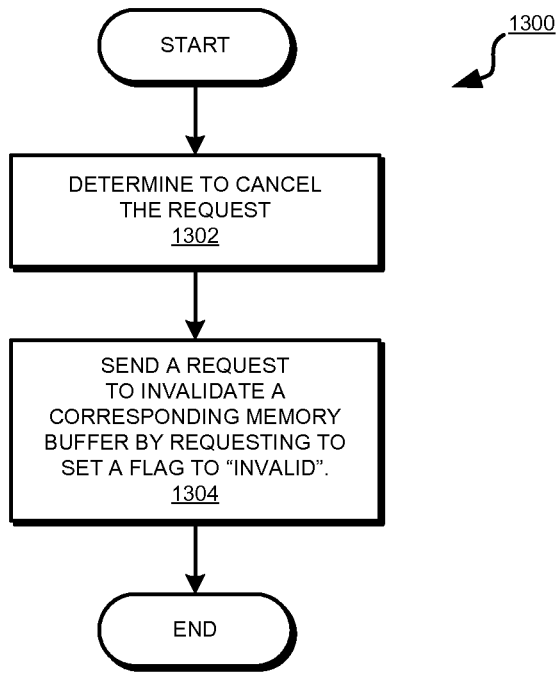
FIG. 13 depicts a flowchart of a process of canceling an I/O request in accordance with an illustrative embodiment.

With reference to FIG. 13, this figure depicts a flowchart of a process of canceling an I/O request in accordance with an illustrative embodiment. Process 1300 may be implemented in a component, such as in component 802 in FIG. 8.

A component may determine that an I/O request should be canceled (block 1302). As an example, the component may make the determination of block 1302 by using process 1000 in FIG. 10. The component sends a request to invalidate a corresponding memory buffer, such as by calling a function that sets a flag corresponding to the memory buffer to "invalid" (block 1304). Process 1300 ends thereafter.

Figure 14:
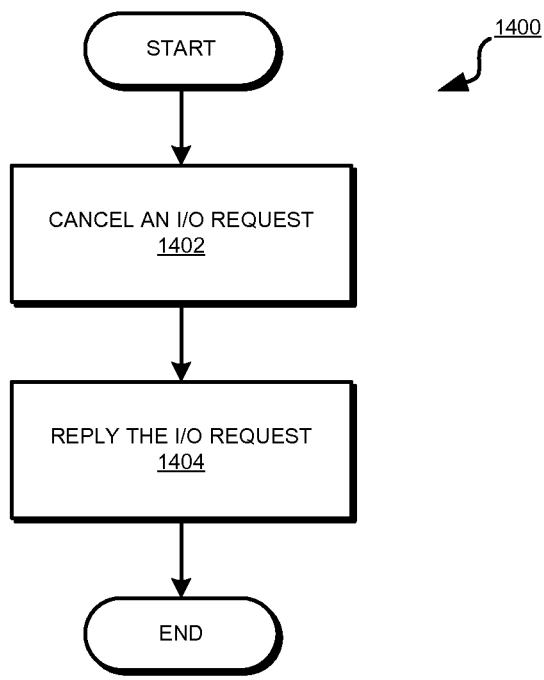
FIG. 14 depicts a flowchart of a process of retrying an I/O request upon fast cancellation in accordance with an illustrative embodiment.

With reference to FIG. 14, this figure depicts a flowchart of a process of retrying an I/O request upon fast cancellation in accordance with an illustrative embodiment. Process 1400 may be implemented in a component, such as in component 802 in FIG. 8.

A component may cancel an I/O request, such as by using process 1000 in FIG. 10 (block 1402). The component may then retry the I/O request without waiting for the cancellation to propagate through the component stack (block 1404). Process 1400 ends thereafter.

Figure 15:
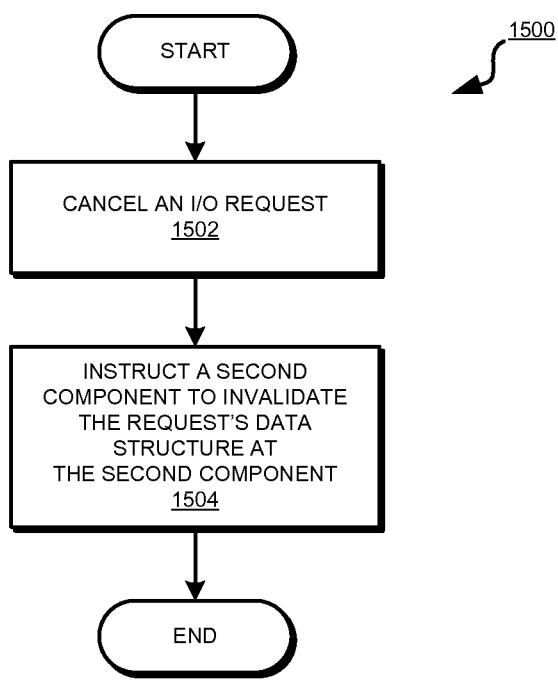
FIG. 15 depicts a flowchart of a process of canceling an I/O request in accordance with an illustrative embodiment.

With reference to FIG. 15, this figure depicts a flowchart of a process of canceling an I/O request in accordance with an illustrative embodiment. Process 1500 may be implemented in a component, such as in component 802 in FIG. 8.

A component may cancel an I/O request, such as by using process 1000 in FIG. 10 (block 1502). The component may then instruct a second component in the component stack to invalidate the I/O request's data structure at the second component (block 1504). Process 1500 ends thereafter.

Figure 16:
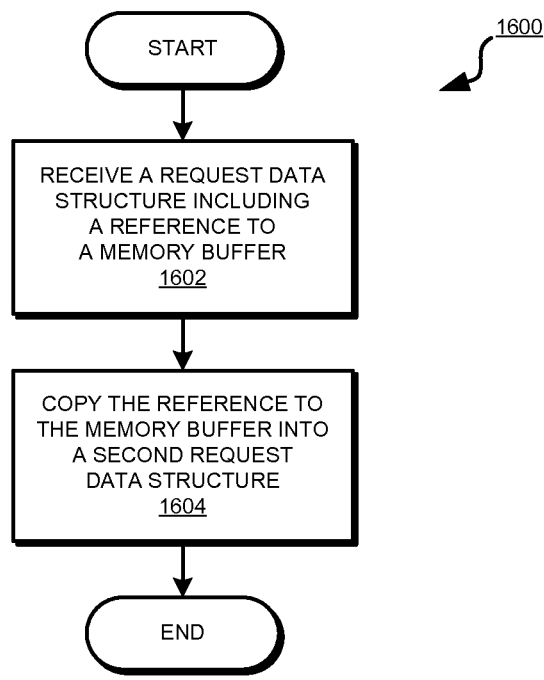
FIG. 16 depicts a flowchart of a process of passing an I/O request from one component to another for fast cancellation in accordance with an illustrative embodiment.

With reference to FIG. 16, this figure depicts a flowchart of a process of passing an I/O request from one component to another for fast cancellation in accordance with an illustrative embodiment. Process 1600 may be implemented in a component, such as in component 802 in FIG. 8.

A component may receive a request data structure of an I/O request from another component (block 1602). The received request data structure includes a reference to a memory buffer associated with the I/O request. The component may copy the reference to the memory buffer into a new request data structure, for example, for passing the I/O request to a third component in a component stack (block 1604). Process 1600 ends thereafter.

Figure 17:
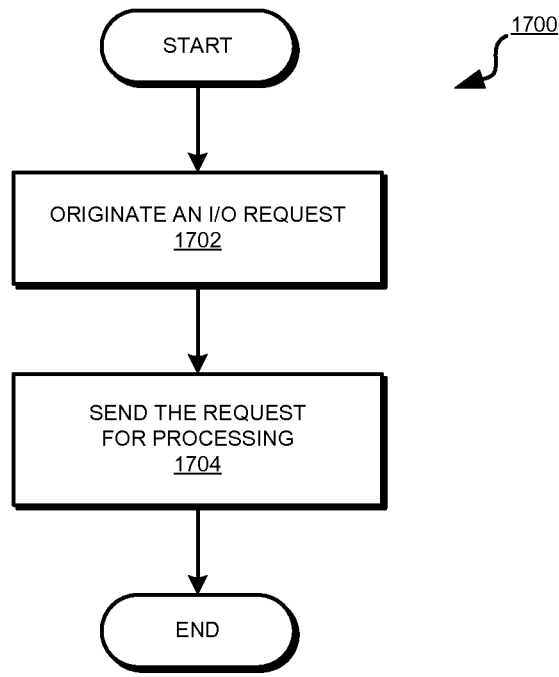
FIG. 17 depicts a flowchart of a process of originating an I/O request in accordance with an illustrative embodiment.

With reference to FIG. 17, this figure depicts a flowchart of a process of originating an I/O request in accordance with an illustrative embodiment. Process 1400 may be implemented in an software program executing in a data processing system, such as an operating system of server 104 in FIG. 1.

The software program may originate an I/O request (block 1702). The software program may send the I/O request to a component stack for processing (block 1704). Process 1700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for fast cancellation of I/O requests in a data processing system. Using an embodiment of the invention, component in a stack can cancel a pending I/O request and retry or fail the I/O request without waiting for the cancellation to propagate through the stack to the root component of the stack. Such retry or failing according to an embodiment avoids memory corruption even when some components in the stack are unaware that the I/O request has been cancelled by another component in the stack.

An embodiment further allows the reuse of the memory buffer associated with a cancelled I/O request for another I/O request. The reuse according to the embodiment also avoids memory corruption by avoiding simultaneous use of the memory buffer for multiple I/O requests. An embodiment further improves the performance of the fast cancellation of I/O requests by facilitating communication between components in a stack to pass instructions for invalidating the request data structure of a pending I/O request.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device" and computer-readable storage device" do not encompass a signal propagation medium such as a copper cable, optical fiber, or wireless transmission medium.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices that can direct one or more computers, one or more other programmable data processing apparatuses, or one or more other devices to function in a particular manner, such that the instructions stored in the one or more computer readable storage devices produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for fast cancellation of an input/output (I/O) request in a data processing system, the method comprising:
a first component, in a stack comprising a set of at least two components, determining whether a memory buffer associated with the I/O request is valid, the memory buffer being an addressable area in a memory in the data processing system, wherein the stack enables the I/O request to be passed using a series of passes between a subset of the set of components to reach a component in the set of components that can access data for an operation being requested in the I/O request, and wherein the memory buffer associated with the I/O request is valid when a reference to the memory buffer is usable to access a portion of the addressable area of the memory;
the first component, responsive to the memory buffer being valid, creating a first request data structure corresponding to the I/O request, wherein the first request data structure is distinct from the memory buffer and includes the reference to the memory buffer; and
the first component passing the first request data structure to a second component in the stack.

2. The method of claim 1, further comprising:
the first component determining whether to cancel the I/O request; and
the first component, responsive to determining to cancel the I/O request, invalidating the memory buffer, thereby performing the fast cancellation of the I/O request.

3. The method of claim 2, wherein the invalidating further comprises:
the first component sending a request to set a flag associated with the memory buffer to an "invalid" status, and wherein the determining whether the memory buffer is valid comprises determining whether the flag indicates a "valid" status for the associated memory buffer.

4. The method of claim 2, further comprising:
the first component retrying the I/O request without waiting for the second component to receive information about the fast cancellation of the I/O request.

5. The method of claim 4, further comprising:
the second component determining whether the memory buffer is valid; and
the second component, responsive to determining that the memory buffer is invalid, ending a processing of the I/O request at the second component.

6. The method of claim 2, further comprising:
the first component instructing the second component to invalidate the first request data structure at the second component.

7. The method of claim 1, further comprising:
the first component receiving a second request data structure corresponding to the I/O request from a third component, the second request data structure including a reference to the memory buffer, and wherein the reference in the first request data structure is a copy of the reference in the second request data structure.

8. The method of claim 7, wherein the third component is an application executing in the data processing system, and wherein the method further comprises:
the application originating the I/O request, wherein the application, the first component and the third component share access to the memory buffer.

9. The method of claim 1, further comprising:
a memory management program executing in the data processing system receiving an instruction from the first component to invalidate the memory buffer;
the memory management program changing a value of a flag associated with the memory buffer to indicate an "invalid" status of the memory buffer;
the memory management program determining whether the memory buffer can be freed for associating with a second I/O request; and
the memory management program, responsive to determining that the memory buffer can be freed, changing the value of the flag to indicate a "free" status of the memory buffer.

10. A computer program product comprising one or more computer-readable tangible storage devices and program instructions which are stored on the one or more storage devices and when executed by one or more processors perform the method of claim 1.

11. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

12. A computer program product for fast cancellation of an input/output (I/O) request in a data processing system, the computer program product comprising one or more computer-readable tangible storage devices, and program instructions stored on at least one of the one or more storage devices, the program instructions comprising:
first program instructions to determine, at a first component, in a stack comprising a set of at least two components, whether a memory buffer associated with the I/O request is valid, the memory buffer being an addressable area in a memory in the data processing system, wherein the stack enables the I/O request to be passed using a series of passes between subset of the set of components to reach a component in the set of components that can access data for an operation being requested in the I/O request, and wherein the memory buffer associated with the I/O request is valid when a reference to the memory buffer is usable to access a portion of the addressable area of the memory;
second program instructions to, responsive to the memory buffer being valid, create a first request data structure corresponding to the I/O request, wherein the first request data structure is distinct from the memory buffer and includes the reference to the memory buffer; and
third program instructions to pass the first request data structure to a second component in the stack.

13. The computer program product of claim 12, further comprising:
fourth program instructions to determine whether to cancel the I/O request; and
fifth program instructions to, responsive to determining to cancel the I/O request, invalidate the memory buffer, thereby performing the fast cancellation of the I/O request.

14. The computer program product of claim 13, wherein the fifth program instructions to invalidate further comprise:
sixth program instructions to send a request to set a flag associated with the memory buffer to an "invalid" status, and wherein the first program instructions to determine whether the memory buffer is valid comprise

21 seventh program instructions to determine whether the flag indicates a "valid" status for the associated memory buffer.

15. The computer program product of claim 13, further comprising:
sixth program instructions to retry the I/O request without waiting for the second component to receive information about the fast cancellation of the I/O request.

16. The computer program product of claim 15, further comprising:
seventh program instructions to, at the second component, determine whether the memory buffer is valid; and
eighth program instructions to, responsive to determining that the memory buffer is invalid, end a processing of the I/O request at the second component.

17. The computer program product of claim 13, further comprising:
sixth program instructions to instruct the second component to invalidate the first request data structure at the second component.

18. The computer program product of claim 12, further comprising:
fourth program instructions to receive a second request data structure corresponding to the I/O request from a third component, the second request data structure including a reference to the memory buffer, and wherein the reference in the first request data structure is a copy of the reference in the second request data structure.

19. The computer program product of claim 18, wherein the third component is an application executing in the data processing system, and wherein the program instructions further comprise:
fifth program instructions to originate the I/O request, wherein the application, the first component, and the third component share access to the memory buffer.

20. The computer program product of claim 12, further comprising:
fourth program instructions to, at a memory management program executing in the data processing system, receive an instruction from the first component to invalidate the memory buffer;
fifth program instructions to change a value of a flag associated with the memory buffer to indicate an "invalid" status of the memory buffer;
sixth program instructions to determine whether the memory buffer can be freed for associating with a second I/O request; and
seventh program instructions to, responsive to determining that the memory buffer can be freed, change the value of the flag to indicate a "free" status of the memory buffer.

21. The computer program product of claim 12, wherein the first, second, and third program instructions are stored in the one or more computer-readable tangible storage devices of a data processing system, and wherein the first, second, and third program instructions are transferred over a network from a remote data processing system.

22. The computer program product of claim 12, wherein the first, second, and third program instructions are stored in the one or more computer-readable tangible storage devices of a server data processing system, and wherein the first, second, and third program instructions are downloaded over a network to a remote data processing system for use in a computer-readable tangible storage device associated with the remote data processing system.

23. A computer system for fast cancellation of an input/output (I/O) request in a data processing system, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:
first program instructions to determine, at a first component, in a stack comprising a set of at least two components, whether a memory buffer associated with the I/O request is valid, the memory buffer being an addressable area in a memory in the data processing system, wherein the stack enables the I/O request to be passed using a series of passes between a subset of the set of components to reach a component in the set of components that can access data for an operation being requested in the I/O request, and wherein the memory buffer associated with the I/O request is valid when a reference to the memory buffer is usable to access a portion of the addressable area of the memory;
second program instructions to, responsive to the memory buffer being valid, create a first request data structure corresponding to the I/O request, wherein the first request data structure is distinct from the memory buffer and includes the reference to the memory buffer; and
third program instructions to pass the first request data structure to a second component in the stack.

24. The computer system of claim 23, further comprising:
fourth program instructions to determine whether to cancel the I/O request; and
fifth program instructions to, responsive to determining to cancel the I/O request, invalidate the memory buffer, thereby performing the fast cancellation of the I/O request.

25. The computer system of claim 24, wherein the fifth program instructions to invalidate further comprise:
sixth program instructions to send a request to set a flag associated with the memory buffer to an "invalid" status, and wherein the first program instructions to determine whether the memory buffer is valid comprise seventh program instructions to determine whether the flag indicates a "valid" status for the associated memory buffer.

* * * * *